United States Patent Office 3,169,937
Patented Feb. 16, 1965

3,169,937
ANTI-CORROSIVE PLASTISOL COMPOSITION COMPRISING POLYVINYL CHLORIDE AND A COMPOUND SELECTED FROM THE GROUP CONSISTING OF CALCIUM PLUMBATE, STRONTIUM PLUMBATE AND BARIUM PLUMBATE
Ryuichi Yashiro, Tokyo, Masahiko Masuda, Chigasaki, and Ichiro Zama, Yokohama, Japan, assignors to The Furukawa Electric Company Limited, Tokyo, Japan, a corporation of Japan
No Drawing. Filed Nov. 21, 1961, Ser. No. 154,056
5 Claims. (Cl. 260—30.4)

The present invention relates to improvements in plastisol compositions of polyvinyl chloride to be used for protective coating of ferrous metal products and more particularly, to the plastisol compositions obtained by adding to 100 weight parts of polyvinyl chloride contained in polyvinyl chloride sol, 0.5 to 50 weight parts of orthoplumbate of alkaline earth metals having the general formula

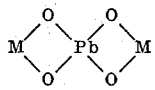

wherein M represents an alkaline earth metal, or by adding to the compositions obtained by mixing the above two, 5 to 150 weight parts of epoxide compounds of organic acid, or by adding to the compositions obtained by mixing the above three, 1.0 to 200 weight parts of organic acid anhydride which makes cross-linking with acid epoxide compounds and the epoxy radical of the said epoxide compounds.

The principal object of the invention is to provide rust-proof protective coating for iron products, such as messenger wires, iron wires or steel tapes for armored cables, and wire srceens, which forms very thin and tough anti-corrosive coating.

In order to prevent corrosion of iron wires to be used for messenger wires, iron wires and steel tapes for armored cables, as well as wire screens, the ferrous metal materials have heretofore been zinc-galvanized for protective coating, or moreover, coated with asphalt or coated with other anti-corrosive substance, such as, polyvinyl chloride, polychloroprene rubber, or have such other substance applied by extrusion to form anti-corrosive film. In such cases, however, the anti-corrosion effect is not sufficient with the zinc-galvanized layer only, and it results in formation of corrosive spots on the materials upon exposing them outdoors for a short period, and also in case of coating solution of anti-corrosive material troublesome processes are required in order to provide excellent coating and repeated coatings for avoiding the formation of pinholes and the formation of corrosive spots after outdoor exposure of a few years was unavoidable. When the protective coating of wires is provided by means of extrusion process, it necessitates complicated steps, and the resulting coated layer becomes thicker so that the outer diameter of finished wires becomes large and also the weight increases.

The present invention is to obviate the above defects and provides a composition consisting of polyvinyl chloride sol which gives excellent corrosion resisting properties and to obtain very thin but tough anti-corrosive protective coating on the desired metal products by coating and baking the composition on the surface of iron products, such as, messenger wires, iron wires or steel tapes for armored cables and wire screens.

In regard to the present invention the following has been found:

The composition, in which 0.5 to 50 weight parts, preferably 2 to 10 weight parts, of orthoplumbate of alkaline earth metals, that is calcium plumbate, strontium plumbate and barium plumbate, is added to 100 weight parts of the polyvinyl chloride contained in the polyvinyl chloride sol that is made for instance by adding such plasticizer as dioctylphthalate to Geon Paste Resin 121, is proof to heat and ultraviolet rays. This composition having low viscosity forms, through baking, a thin and tough gel film. The said alkaline earth metals capture hydrochloric acid, which is a decomposed material of the sol, to stabilize the film, thereby providing excellent rust-proofness to the metal surface.

Polyvinyl chloride sols are usually obtained by mixing polyvinyl chloride paste resin, having grain size of about 1.5μ, with a plasticizer, such as phthalate ester type plasticizer, and by heating such sol to a temperature above its fusing point the plasticizer is dissolved into the resin and forms a uniform gel, thereby providing a tough film. However, polyvinyl chloride is unstable to the heat and experiences dehydrochlorination upon heating, and the activated chlorine accelerates said reaction, thereby causing chain reaction to induce the breaking of molecules, and moreover due to the unstability of the thermally decomposed material it is difficult to provide a smooth coating when said sol is coated and baked on the metallic surface, and as the weather resistance is reduced, the formed hydrochloric acid attacks the metallic surface, so that the polyvinyl chloride sol cannot be satisfactorily applied as the anti-corrosive protective coating material. In order to improve the thermal stability of polyvinyl chloride sols, stabilizers of inorganic or organic compounds, such as lead carbonate and dibutyl tin laurate, have usually been added, yet with such compositions no sufficient anti-corrosion of the metallic surface has been obtained.

The composition covered by this invention represents a mixture obtained by adding to polyvinyl chloride sol, orthoplumbate of alkaline earth metals entirely different in type from the conventional stabilizers. The orthoplumbate of alkaline earth metals is a compound obtained by mixing an oxide of alkaline earth metals and lead oxide (PbO) and fused at a temperature of 700° C. or over. For example orthocalcium plumbate $$(2CaO \cdot PbO_2)$$

has the following formula:

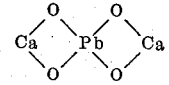

The reason for adding orthoplumbate of alkaline earth metals to polyvinyl chloride sol as a stabilizer is that the plumbate provides a sufficient protective effect to the metallic surface by the cooperation of metallic ions of alkaline earth metals and lead ions and that when the film of polyvinyl chloride is formed on the metallic surface it provides considerably large anti-corrosion effect. Such effect cannot be brought about by the mere mixing of PbO and an oxide of alkaline earth metals.

According to the invention, by adding, as plasticizer, to polyvinyl chloride resin in the above composition, 5 to 150 weight parts, preferably 30 to 70 weight parts, of epoxy compounds selected from the group consisting of butyl-epoxy stearate, 3,4-epoxy cyclohexyl methyl ester, 9,10-epoxy-iso-octyl-stearate, 3,4-epoxy-6 methyl cyclohexyl methyl ester, 3,4-epoxy-6-methyl cyclohexane carboxylate, the epoxy radical and also orthoplumbate of the alkaline earth metals act synergistically to increase the thermal stabilizing effect.

Further, according to the invention, by adding organic anhydride and its derivatives which effects cross-linking with the epoxy radical in the epoxide compounds, such as "methyl nadic acid anhydride" (methylated maleic adduct of phthalic anhydride), pyromellitic dianhydride, dodecenyl succinic anhydride, and chlorendic anhyride, at the rate of 1 to 200 weight parts, preferably 2 to 150 weight parts, the film formed upon heating becomes hardened, thereby increasing the wear resistance. The reason why the quantity of added orthoplumbate of alkaline earth metals is limited to 0.5 to 50 weight parts is that below 0.5 weight parts no appreciable stabilizing effect can be obtained and that above 50 weight parts no further improvement can be brought about because the above orthoplumbate acts as a mere filler. Further, the reason why the quantity of epoxide compounds of organic acid is limited to 5 to 150 weight parts is that at less than 5 weight parts no sufficient effect is obtained, while at above 150 weight parts the physical properties of the sol composition deteriorate, and also the reason for limiting the added quantity of the organic acid anhydride to 1 to 200 weight parts is that such quantity is naturally limited since the added quantity is proportional to the epoxide equivalent in the epoxide compounds.

The invention will be explained with reference to the following examples, wherein the "part" means weight part.

EXAMPLE 1

To polyvinyl chloride sol which is made by adding to 100 parts of Geon No. 121 resin 65 parts of dioctylphthalate is added 3 parts of calcium plumbate and mixed together, so as to make a plastisol having the viscosity of about 30 poises. For comparison, four known plastisol compositions were prepared by adding to the above polyvinyl chloride sol, each of the stabilizers: (A) a mixture of lead oxide and calcium oxide, (B) tribasic lead sulphate, (C) basic lead carbonate, and (D) dibutyl tin laurate, and such plastisol composition (E) by adding no stabilizer.

Each plastisol had the viscosity of about 30 poises, same as above. The results are shown in Table 1.

Table 1

|  | Present invention (parts) | Known products (parts) |  |  |  |  |
|---|---|---|---|---|---|---|
|  |  | A | B | C | D | E |
| Geon 121 resin | 100 | 100 | 100 | 100 | 100 | 100 |
| Dioctylphthalate | 65 | 65 | 65 | 65 | 65 | 65 |
| Calcium plumbate | 3 | | | | | |
| Lead oxide | | 1.7 | | | | |
| Calcium oxide | | 1.3 | | | | |
| Tribasic lead sulphate | | | 3 | | | |
| Basic lead carbonate | | | | 3 | | |
| Dibutyl tin laurate | | | | | 3 | |

With the above plastisol compositions, films of 0.3 mm. were made respectively, and said films were maintained in a thermostatic oven at 160° C. for 1 hour and two hours respectively, and changes of hue, tensile strength and elongation were measured and the results are shown in Table 2.

Further each of the above plastisols was coated on a zinc-galvanized iron wire of 3.2 mm. dia. and the wire was passed through a vertical baking furnace of 6 m. long having the maximum temperature of 220° C. and thus the anti-corrosive iron wire having a finished external diameter of 3.8 mm. was manufactured.

Each of the above iron wires was subjected to the corrosion test in a weather-o-meter under the condition of irradiation of ultraviolet rays for 51 minutes, and the ultraviolet ray irradiation and water spray for 9 minutes and drum revolution 1 r.p.m., and the time until corrosive spots and swelling were created in the film coating was measured. The results are shown in Table 2. The values of tensile strength and elongation were compared by taking the initial values as 100.

Table 2

| | Hue | | Tensile strength (rate of change) | | Elongation (rate of change) | | Corrosion resistance (hour) |
|---|---|---|---|---|---|---|---|
| | 160° C.×1 hr. | 160° C.×2 hrs. | 160° C.×1 hr. | 160° C.×2 hrs. | 160° C.×1 hr. | 160° C.×2 hrs. | |
| Present invention | No change | No change | 101 | 103 | 96 | 85 | 1,500 |
| Known product: | | | | | | | |
| A | Brown | | 83 | | 81 | | 250 |
| B | Cream | Cream | 112 | 113 | 93 | 73 | 500 |
| C | do | Black | 121 | 133 | 93 | 65 | 350 |
| D | Light brown | Light brown | 120 | 144 | 86 | 71 | 400 |
| E | Black | Black | 113 | 72 | 74 | 32 | 200 |

As shown by the above table, the plastisol under the invention having calcium plumbate incorporated therein showed considerably better thermal stability and corrosion resistance than any other conventional plastisols, especially than the plastisol A which contains, as stabilizer, a mixture of lead oxide and calcium oxide.

EXAMPLE 2

By mixing materials as shown in Table 3, a plastisol composition having a viscosity of about 60 poises was obtained.

Table 3

| | Parts |
|---|---|
| Polyvinyl chloride resin used as paste (Exon 654) | 100 |
| Di-2-ethylhexylphthalate | 22 |
| Hydrogenated tarphenylene | 13 |
| Clay | 20 |
| Mineral spirit | 3 |
| Calcium plumbate | 5 |

The above plastisol composition was applied as the anti-corrosion layer for the messenger wire of the city telephone cables, that is, the adhesive consisting of polyvinyl chloride, polyvinyl acetate and nitrile rubber was previously coated on the surface of steel wire of 3.2 mm. dia. and dried (thickness of the coating, 0.02 mm.), and on the outside of the steel wire was coated the above sol composition. The steel wire was then passed through a vertical type baking furnace, 6 m. long, at the highest temperature of 260° C. so as to have a finished external diameter of 3.9 mm. Seven of these anti-corrosive steel wires were stranded together to form an anti-corrosion messenger wire.

The anti-corrosiveness of the above steel wire was measured under the same testing condition as in Example 1 and the results are shown in Table 4.

For comparison, the corrosion resistance of the galvanized steel wire used for the conventional messenger wire, measured in the same manner as described above, is shown in Table 4.

Table 4

| | Hours |
|---|---|
| Present invention | 1,500 |
| Known product | 50 |

As is shown from the above, the messenger wire applied with the above composition under the invention showed considerably superior corrosion resistance compared with known messenger wires.

EXAMPLE 3

By mixing the materials as shown in Table 5, the plastisol composition having a viscosity of about 30 poises was obtained.

Table 5

| | Parts |
|---|---|
| Vinyl chloride resin used for paste (QYNV of Bakelite) | 100 |
| Di-octyladipate | 65 |
| Barium plumbate | 3 |

The above plastisol composition was coated on the outer surface of a zinc-galvanized steel wire of 3.5 mm. dia. and the wire was passed through a vertical baking furnace of 6 m. long at the highest temperature of 220° C. to provide an anti-corrosion steel wire having a finished external diameter of 3.8 mm. and seven of the steel wires were stranded together to form a core having external dia. of 11.4 mm., and on this steel core 54 aluminimum wires, each having 3.8 mm. dia. were stranded together to manufacture anti-corrosive A.C.S.R. (Aluminum Conductor Steel Reinforced Wire) wire.

The corrosion resistance of the anti-corrosive steel wire of 3.8 mm. dia. was measured by the same method as for the test described in Example 1 and the results are shown in Table 6.

For comparison, the corrosion resistance of the zinc galvanized steel wire of 3.8 mm. dia. coated with ordinary asphalt was measured and its result is described in Table 6.

Table 6

| | Hours |
|---|---|
| Present invention | 1,000 |
| Known product | 80 |

As is seen from the above table, the A.C.S.R. (Aluminum Conductor Steel Reinforced Wire) wire having anti-corrosion layer of the present composition showed considerably better corrosion resistance than an ordinary anti-corrosive A.C.S.R. (Aluminum Conductor Steel Reinforced Wire) wire.

EXAMPLE 4

By mixing the materials shown in Table 7, the plastisol composition having a viscosity of about 35 poises was obtained.

Table 7

| | Parts |
|---|---|
| Polyvinyl chloride resin used as paste (Opalon 410) | 100 |
| Di-2-ethylhexyl phthalate | 35 |
| Di-ethyladipate | 30 |
| Strontium plumbate | 10 |
| Shaningreen | 3 |

The above plastisol composition was applied to wire screen as corrosion resisting layer, i.e., the above pastisol was coated on iron wires of 2.8 mm. dia. and the wires were then passed through a vertical baking furnace, 6 m. long having the maximum temperature of 250° C. to provide anti-corrosive iron wires having the finished outer diameter of 3.0 mm., which were then made into a wire screen.

The corrosion resistance of the anti-corrosive iron wire was measured by the same method as for the test described in Example 1 and its result is shown in Table 8.

For comparison, a conventional anti-corrosive wire screen was made by zinc-galvanized iron wires of 2.8 mm. dia. and coated three times with alkyd modified drying oil paint, and its corrosion-resistance was measured in the similar manner and the result is also shown in Table 8.

Table 8

| | Hours |
|---|---|
| Present invention | 1,000 |
| Known product | 100 |

As is seen from the above table, the anti-corrosive wire screen coated with the composition under the invention showed considerably better corrosion resistance than the conventional anti-corrosive wire screen.

EXAMPLES 5 AND 6

In order to test the effect of addition of epoxide compounds, the materials shown in Table 9 were mixed to provide two plastisol compositions, both having a viscosity of about 35 poises.

Table 9

| | Example 5, parts | Example 6, parts |
|---|---|---|
| Polyvinyl chloride resin used as paste (Geon 121 resin) | 100 | 100 |
| Di-2-ethylhexyl phthalate | 50 | 50 |
| Butyl epoxy stearate | | 50 |
| Calcium plumbate | 50 | 50 |

The plastisol compositions thus obtained were charged respectively into an extruder having a temperature of 190° C. to be applied on the surface of zinc-galvanized iron wires of 2.6 mm. dia. to provide rust-proof iron wires having anti-corrosive layer of 0.9 mm. thickness (finished external dia. of 3.5 mm.). The above wire, serving as a tension member, was stranded together with two 0.90 mm. dia. copper wires, each having a 0.3 mm. thickness polyvinyl chloride coating, so as to form Rural Distribution wire.

The corrosion resistance of the anti-corrosion iron wires used for the R.D. wire was measured by the same manner as in the testing of Example 1 and its results are shown in Table 10.

For comparison, the corrosion resistance of the anti-corrosion iron wire coated in the same manner as above with a suspension of an ordinary polyvinyl chloride compound applied to zinc-galvanized iron wire of 2.6 mm. dia. was measured by the same method as above stated and the results are shown in Table 10.

Table 10

| Present invention | | Known product, hours |
|---|---|---|
| Example 5, hours | Example 6, hours | |
| 2,500 | 3,000 | 1,000 |

As is known from the above table, in the electric wires according to the invention its corrosion resistance differs considerably by the addition or absence of the epoxide compound, and the conventional product is very inferior.

EXAMPLES 7 AND 8

In order to test the effect of adding hardening agent to the compositions of the invention, the materials as shown in Table 11 were mixed into two plastisol compositions both having a viscosity of about 50 poises.

Table 11

| | Example 7, parts | Example 8, parts |
|---|---|---|
| Polyvinyl chloride resin used for paste (Geon 102 resin) | 70 | 70 |
| (Geon 103 resin) | 30 | 30 |
| Di-2-ethylhexyl phthalate | 50 | 50 |
| Epoxylated soybean oil | 50 | 50 |
| Nadic methyl anhydride | | 50 |
| Clay | 10 | 10 |
| Calcium plumbate | 30 | 30 |

The plastisols thus obtained were each coated on the surface of zinc galvanized iron wires of 6 mm. dia. and the wires were then passed through a vertical baking furnace of 6 m. length having the highest temperature of 250° C. and anti-corrosive zinc-galvanized iron wires having finished external dia. of 7 mm. were manufactured. Thirty of these iron wires were wound on the jute hedding of a telephone cable having lead sheath of 52 mm. outer dia. and further, jute serving was wound thereon to provide anti-corrosive submarine cable. The abrasion resistance of the anti-corrosive zinc-galvanized iron wires was measured according to the standard of Mil-Spec. C-5756 and its results are shown in Table 12.

Further, the abrasion resistance of the corrosion resisting zinc-galvanized iron wires of 4.5 mm. dia. having anti-corrosive layer of neoprene of 1.25 mm. thickness, used for ordinary submarine cables, was measured by the same test method as stated above and its results are described in Table 12.

*Table 12*

| Present Invention | | Known product, oscillations |
|---|---|---|
| Example 7, oscillations | Example 8, oscillations | |
| 62 | 325 | 112 |

When the iron wires having the anti-corrosive layer of the compositions covered by the present invention and those having the layer of the conventional compositions which had been made bare in the above abrasion resistance test, were dipped in 3% salt water for 1 month, the zinc galvanized layer only of the former wires at their bare portion swelled, while the whole zinc galvanized layer of the latter wore off.

Further, the corrosion resistance property of the product covered by the invention and that of the known product were measured under the same condition as given in Example 1 and the results are described in Table 13.

*Table 13*

| Present Invention | | Known product, hours |
|---|---|---|
| Example 7, hours | Example 8, hours | |
| 4,000 | 4,000 | 1,500 |

As can be seen from the Table 13, the plastisol composition under the invention added with the hardening agent of organic acid anhydride (nadic methyl anhydride, Example 8) showed considerably excellent abrasion resistance compared with the one which has no added hardening agent (Example 7).

The submarine cable having an anti-corrosive layer made of the compositions covered by the invention, despite the fact that the layer is as thin as 0.5 mm. on 6 mm. component wires, has much more excellent abrasion resistance and anti-corrosiveness than the conventional cable having 1.25 mm. thickness neoprene anticorrosive layer on its 4.5 mm. wires.

The composition under the invention can be applied not only to the zinc-galvanized or tin-plated wires but also to pipes and plates to provide them with excellent anti-corrosiveness. As an example, an iron plate coated and baked with the composition under the invention is shown in Example 9.

EXAMPLE 9

The composition covered by the invention and the conventional composition, both having about 80 poises, were made by mixing the respective materials shown in Table 14.

*Table 14*

| | Present invention, parts | Known product, parts |
|---|---|---|
| Polyvinyl chloride dispersion resin (Geon 121 resin) | 70 | 70 |
| Polyvinyl chloride suspension resin (Geon 103 resin) | 30 | 30 |
| Di-2-ethylhexyl phthalate | 70 | 65 |
| 9,10,12,13-diepoxy stearate | 30 | |
| Pyromellitic anhydride | 50 | |
| Calcium plumbate | 5 | |
| Titanium dioxide | 10 | 10 |
| Clay | | 10 |

Each of the above plastisol compositions was coated uniformly by floating knife coating process on an iron plate of 0.75 mm. thickness, to the thickness of 0.25 mm. and the plate was passed through a vertical baking furnace of 6 m. length having the highest temperature of 270° C., to make it anti-corrosive.

The corrosion resistance of the anti-corrosive iron plate thus prepared was measured by the same process as described in Example 1, and the result is shown in Table 15.

*Table 15*

| | Hours |
|---|---|
| Present invention | 2,000 |
| Known product | 1,500 |

The abrasive resistance of the above iron plate was measured by Tabar abrasion process (the mg. loss after 1,000 cycles with 1 kg. weight by CS No. 10 Calibrase wheel). The result is shown in Table 16.

*Table 16*

| | Mg. |
|---|---|
| Present invention | 82 |
| Known product | 450 |

As is known from the above table, the anti-corrosive iron plate having the composition under the invention applied showed considerably better corrosion resistance and abrasion resistance than those of an ordinary anti-corrosive iron plate. The above iron plate is well adapted for use for trunks and door shutters.

As described in the foregoing, the composition under the invention forms the protective coating of thin and uniform layer without pinholes by coating and baking only once the surface of messenger wires, zinc-galvanized iron wires and wire screens to provide a plastisol which has good thermal stability and contains no solvent, and the coating exhibits excellent properties, such as high corrosion resistance.

What we claim is:

1. A plastisol composition which comprises about 0.5 to 50 weight parts of a compound selected from the group consisting of calcium plumbate, strontium plumbate and barium plumbate; and about 100 weight parts of polyvinyl chloride.

2. A plastisol composition according to claim 1, further comprising about 5 to 150 weight parts of a compound selected from the group consisting of butyl-epoxy stearate, 3,4-epoxy cyclohexyl methyl ester, 9,10-epoxy-iso-octyl-stearate, and 3,4 - epoxy - 6 methyl cyclohexyl methyl ester.

3. A plastisol composition which comprises about 0.5 to 50 weight parts of a compound selected from the group consisting of calcium plumbate, strontium plumbate and barium plumbate; about 5 to 150 weight parts of a compound selected from the group consisting of butyl-epoxy stearate, 3,4-epoxy cyclohexyl methyl ester, 9,10-epoxy-iso-octyl-stearate, 3,4-epoxy-6 methyl cyclohexyl methyl ester; about 1.0 to 200.0 weight parts of a compound selected from the group consisting of methylated maleic adduct of phthalic anhydride, pyromellitic dianhydride, dodecenyl succinic anhydride and chlorendic anhydride; and about 100 weight parts of polyvinyl chloride.

4. A ferrous surface having a corrosion resistant coating formed from a plastisol composition according to claim 1.

5. A cable comprising an outer sheath, and a core comprising a plurality of twisted ferrous wires, each of said wires having a layer baked thereon formed from a plastisol composition according to claim 1.

References Cited by the Examiner

UNITED STATES PATENTS

| | | | |
|---|---|---|---|
| 430,653 | 6/90 | Kassner | 23—51.1 |
| 2,707,178 | 4/55 | Wilson | 260—45.75 |
| 2,795,565 | 6/57 | Newey | 260—30.4 |
| 2,913,432 | 11/59 | Gulick | 260—41 |
| 3,047,415 | 7/62 | Rhodes et al. | 260—30.4 |

FOREIGN PATENTS 11,899  9/89  Great Britain.

MORRIS LIEBMAN, *Primary Examiner.*

LEON J. BERCOVITZ, *Examiner.*